3,028,322
MANUFACTURE OF ALKYLLEAD COMPOUNDS
Paul Kobetz and Richard C. Pinkerton, Baton Rouge, La.,
 assignors to Ethyl Corporation, New York, N.Y., a corporation of Delaware
No Drawing. Filed Dec. 24, 1959, Ser. No. 861,756
5 Claims. (Cl. 204—62)

This invention relates to the manufacture of organolead compounds and more particularly to the manufacture of tetraorganolead compounds and especially tetraalkyllead compounds, such as tetraethyllead.

Tetraethyllead is extensively used as an antiknock in the manufacture of gasoline. The entire commercial production of this compound is now made by reacting a sodium-lead alloy with ethyl chloride according to the following equation:

$$4NaPb + 4C_2H_5Cl \rightarrow (C_2H_5)_4Pb + 3Pb + 4NaCl$$

As will be seen from the above equation, the theoretical maximum yield for the reaction is 25 percent, based upon the lead, and in normal operation does not exceed about 22 percent. In addition, the above process requires many auxiliary operations; such as the formation of the sodium-lead alloy, the recovery and resmelting of large quantities of unreacted lead and the use of high pressure equipment suitable for relatively high temperature reactions.

It has been recognized that tetraethyllead can be manufactured by electrolytic techniques using a lead anode and an electrolyte containing aluminum-ethyl compounds to give theoretically 100 percent yield. However, such processes have not been used commercially because of serious limitations, such as the use of electrolytes which have poor efficiency at high current densities. Thus, the process requires unduly large cells to produce a unit quantity of tetraethyllead. In addition, the conductivity of these electrolytes is relatively poor.

It is accordingly an object of this invention to provide an improved process for the manufacture of tetraorganolead compounds and especially tetraalkyllead compounds, such as tetraethyllead. Another object is to provide an electrolytic process capable of producing large quantities of tetraorganolead compounds in a relatively small electrolytic cell. Still another object is a process in which the tetraorganolead can be readily separated from the electrolyte and by-products by simple and economical techniques and in which the by-product can be regenerated and returned to the cell.

These and other objects of the invention are obtained if the electrolyte contains an alkali metal aluminum methyl compound and especially an alkali metal aluminum tetraalkyl in which at least one of the alkyl groups is a methyl group. An especially desirable electrolyte for carrying out the process of this invention comprises a mixture or complex of an alkali metal aluminum methyl compound with an alkali metal aluminum tetraalkyl or tetraaryl, the organo groups of the latter compound containing from 2 to about 12 carbon atoms.

More specifically the process for manufacture of tetraorganolead compounds in accordance with this invention comprises passing an electrolyzing current from a lead anode through an electrolyte comprising an alkali metal aluminum tetraorgano compound having the formula $$MAl(CH_3)_xR_{4-x}$$

wherein M is an alkali metal, R is selected from the group consisting of alkyl and aryl groups, each group containing from 2 to 12 carbon atoms, and $x$ is an integer of from 1–4 inclusive. An especially preferred embodiment of this invention relates to the manufacture of tetraethyllead using a mixed complex having, in addition to the alkali metal aluminum methyl compound, another alkali metal aluminum compound in which all of the organo groups contain from 2 to 12 carbon atoms. An especially preferred electrolyte contains more than one alkali metal, e.g. both sodium and potassium or sodium and lithium or all three metals.

The electrolyte mixture usually contains from 5–95 percent of the alkali metal aluminum methyl compound. Best results are obtained using a concentration of the alkali metal aluminum methyl compound of from 10–75 mole percent. A preferred concentration of the alkali metal aluminum methyl compound in the electrolyte mixture is from about 20–65 mole percent. In general, the electrolyte mixture should have a melting point below about 150° C. for manufacture of alkyllead compounds and the most preferred electrolytes have melting points below 100° C. The pure sodium aluminum tetramethyl, for example, has a melting point in excess of 240° C. but the addition of relatively small quantities of the sodium or potassium aluminum tetraethyl, or higher organo compounds, sharply reduces the melting point of the mixture.

The above process involves exceptionally simple techniques and apparatus and provides exceedingly high yields of the tetraorganolead, in essence, directly from lead, hydrogen, and olefin. The lead metal is converted at the anode to tetraorganolead and the electrolyte, in the manufacture of alkyllead compounds, can be regenerated, either periodically or continuously, by reaction with an olefin and hydrogen. The process is capable of extremely high production capacities because it can be operated at high current densities, and this is practical because of the very high conductivity of the complex electrolyte. The process can be conducted at these high current densities at temperatures well below the thermal decomposition temperature of the tetraorganolead. This good conductivity also materially reduces the problem of heat removal from the cell. A particularly surprising feature of this invention is that the lead product does not contain any methyl groups when the electrolyte contains R groups in addition to the methyl groups but instead the methyl groups are recovered as aluminum-containing compounds which can be readily converted to the complex alkali metal aluminum methyl compound and recycled to the electrolytic cell. The aluminum-methyl by-product (without alkali metal) has a materially lower boiling point than the lead alkyl compound and thus can be readily separated from the organolead product. Essential functions of the alkali metal aluminum methyl compound, in other words, are to provide high conductivity to the system and at the same time form an aluminum-containing by-product which can be readily separated from the organolead product. As will be seen from the following discussion through regeneration of the alkali metal aluminum alkyl, the only raw materials necessary for this process are metallic lead, olefin and hydrogen. When using the mixed electrolyte, the aluminum methyl compound is formed in from 5–30 percent of the total product and in some cases up to about 50 percent and can be recovered as a second product or converted back to the alkali metal-containing compound for reuse in the process.

The reaction of the present process can be illustrated, using the mixed electrolyte, as follows:

$$4MAlR_4 + Pb \xrightarrow{MAlMe_3} 4M + 4AlR_3 + PbR_4$$

wherein M, Me, and R are as defined above. The $AlR_3$ can be separated from the tetraorganolead by distillation or by chemical means. In addition, some methyl-containing aluminum compounds are formed which may, under certain conditions, react with the $AlR_3$ to form mixed organo compounds. A suitable chemical method of recovering the tetraorganolead and regenerating the aluminum compound is to react the aluminum compound with an alkali metal boron compound in accordance with the following equation:

$$AlR_3 + MBR_4 \rightarrow MAlR_4 + BR_3$$

or $$AlR_2Me + MBR_4 \rightarrow MalR_3Me + BR_3$$

The complex can then be regenerated by the following equations:

$$BR_3 + MH \rightarrow MBR_3H$$
$$MBR_3H + olefin \rightarrow MBR_4$$

As discussed above, it is convenient to carry out the electrolysis of this invention using an electrolyte containing both an alkali metal aluminum tetramethyl and an alkail metal aluminum tetraalkyl in which the alkyl contains at least 2 carbon atoms. It is to be recognized that the electrolyte can contain two or more methyl-containing compounds, such as sodium aluminum methyl triethyl, sodium aluminum dimethyl diethyl and sodium aluminum trimethylethyl, and especially mixed compounds of two or more alkali metals.

The present process can be carried out over an exceedingly wide temperature range, generally from 0 to about 200° C. The upper temperature at the anode is usually limited by the decomposition temperature of the tetraorganolead under reaction conditions. Accordingly, with tetraethyllead, it is usually desirable to maintain the temperature below about 100 to 110° C. However, with organolead thermal stabilizers, the process can be carried out at temperatures above 200° C. without appreciable decomposition. When using a sodium compound, for example, the cathode temperature is best maintained above about 100° C. so as to remove the sodium in a liquid state. With potassium or sodium-potassium alloys lower temperatures can be used.

Typical examples of organolead thermal stabilizers which can be used in the present invention are disclosed in U.S. Patents 2,660,591 through 2,660,596 inclusive. A representative group of thermal stabilizers which can be used in accordance with this invention are butadiene, diamylene, dipentene, heptene, trimethylethylene, styrene, divinylbenzene, cyclohexane, dicyclopentadiene, azobenzene, 2,2'-azonaphthalane, allyl isothiocyanate, anthracene, chrysene, napththalene, alpha-methyl naphthalene, tetrahydronaphthalene, indene, di-isobutylene, tetramethylethylene, thiocyanate, semi-carbazide, stilbene, methyl styrene, o-ethylstyrene, and lepidine. These stabilizers are normally used in amounts varying from 0.01 to about 50 percent by weight of the tetraorganolead compound and greatly increase the stability of the lead compound at more elevated temperatures.

In some cases it is desirable to use an extractant for the tetraorganolead compound directly in the electrolysis cell. These extractants can be either miscible or nonmiscible with the electrolyte. Typical examples of suitable extractants are those listed above as stabilizers and include both aliphatic and aromatic hydrocarbons. Excellent results are obtained with such extractants as kerosene and mineral oil used in a concentration of from about 25 to 75 percent of the tetraorganolead formed.

Normally, the electrolysis is conducted at or near atmospheric pressure. However, a pressure of hydrogen or inert gas such as nitrogen can be employed when desired, especially to assure an oxygen and moisture-free system. In some cases, it is desirable to employ a reduced pressure to effect distillation of the tetraorganolead compound and/or the aluminum compound from the cell during the electrolysis.

The following are typical examples of the process of this invention, all parts being given in parts by weight.

EXAMPLE I

A closed cell was provided with an annular copper cathode and an axially positioned lead anode. To this cell was added an electrolyte containing equimolar proportions of sodium aluminum tetramethyl and sodium aluminum tetraethyl. The cell was heated to a temperature of approximately 100° C. and a 3.6 volt potential was applied across the electrodes. The current density in amperes/sq. cm. was 0.25. The anode efficiency was approximately 77 percent. Tetraethyllead was produced at the anode and formed a separate phase from the electrolyte. It was drained by gravity from the cell. Sodium metal was deposited at the cathode during the electrolysis and this was also removed as a liquid from the cell. The methyl and ethyl aluminum by-products, mixed with tetraethyllead and minor quantities of electrolyte, are then reacted with sodium boron tetraethyl at a temperature of 100° C. to produce the corresponding sodium aluminum alkyl and the corresponding alkyl boron compound. The latter is a gas at reaction temperature and can be readily separated from the complex aluminum compound. Tetraethyllead is then separated and recovered. The aluminum complex is thereafter recycled to the electrolytic cell.

EXAMPLE II

Example I was repeated except that 25 mole percent of potassium metal was added to the electrolyte to displace the corresponding amount of sodium metal. In this electrolysis the current density in amperes/sq. cm. was 0.5 and the anode efficiency increased to 82 percent.

EXAMPLE III

Example I was repeated except that the electrolyte consisted of 3 moles of sodium aluminum tetraethyl and 1 mole of sodium aluminum tetramethyl. The anode efficiency in this example increased to 89 percent and with a current density in amperes/sq. cm. of 0.25.

EXAMPLE IV

Example III was repeated except that 10 mole percent potassium was added to displace a corresponding quantity of sodium, providing an electrolyte containing both sodium and potassium. In this instance, the anode efficiency increased to 96 percent at a current density in amperes/sq. cm. of 0.25.

The following examples tabulated in the table are carried out in a similar fashion to that of Example I. The product in each instance is a tetraalkyllead having 2 or more carbon atoms in each alkyl group, with the exception of Example VIII which forms tetramethyllead. In each instance excellent conductivity is obtained and the organolead compound is produced in good yield.

Table

| Example No. | MAlMe₄ | MAlR₄ | MAlMe₄/MAlR₄ Mole Ratio | Stabilizer Type | Stabilizer Percent of TEL Product | Temp., °C. | Product |
|---|---|---|---|---|---|---|---|
| V | KAlMe₄ | KAl(i-pr)₄ | 8 | Napthhalene | 25 | 180 | Tetraisopropyllead. |
| VI | NaAlMe₄ | NaAl(C₆H₅)₄ | 0.1 | Anthracene | 35 | 220 | Tetraphenyllead. |
| VII | LiAlMe₄ | NaAl(C₁₀H₂₁)₄ | 0.3 | Styrene | 15 | 40 | Tetra(n-decyl)lead. |
| VIII | RbAlMe₄ | NaAl(CH₃)₄ | 5 | Methylated Naphthalenes. | 5 | 100 | Tetramethyllead. |
| IX | NaAlMe₄ | CsAlEt₄ | 2 | Azobenzene | 1 | 80 | Tetraethyllead. | i-pr=isopropyl.
C₆H₅=phenyl.

EXAMPLE X

Example I is repeated except that the electrolyte consists of sodium aluminum tetramethyl, potassium aluminum tetraethyl, and lithium aluminum tetraethyl in equimolecular proportions. In addition, mineral oil (80 weight percent of the tetraethyllead product) was employed in the electrolyte as an extractant to aid in the removal of the tetraethyllead.

The alkali metal aluminum methyl compounds can be prepared in one of several ways. A convenient process involves the displacement reaction of the elemental alkali metal with aluminum trimethyl forming the corresponding alkali metal tetramethyl. These compounds can also be prepared by the addition reaction of aluminum trimethyl and alkali metal alkyl compounds, or contrarywise, aluminum trialkyls with sodium methyl. A particularly suitable method for the mixed alkyl compounds is the reaction of an olefin, e.g. ethylene with an alkali metal aluminum alkyl hydride. Likewise, the complex methyl compound can be made by reaction of an alkyl halide with an alkali metal and trimethyl aluminum.

The alkali metal aluminum tetraorgano compound (the organo group containing 2 or more carbon atoms) can be made by analogous processes. That is, the alkali metal can be reacted directly with the aluminum triorgano compound, e.g. sodium reacts with triethyl aluminum to form sodium aluminum tetraethyl and metallic aluminum. Likewise, sodium ethyl and other alkali metal organo compounds will react directly with the aluminum triorgano compound to form the complex as an addition product. The corresponding organo halides will also react with the alkali metal and aluminum triorgano compound to form the complex, for example, sodium reacts with ethyl chloride and aluminum triethyl to form sodium aluminum tetraethyl. A particularly desirable method of preparing the alkyl complexes is the process discussed above with reference to regeneration of the trialkyl aluminum electrolyte. Trialkyl aluminums, e.g. trimethyl aluminum or triethyl aluminum, will react with an alkali metal hydride such as sodium hydride to form the corresponding complex hydride, e.g. sodium aluminum triethyl hydride, which can thereafter be reacted with a suitable olefin, as discussed above, forming sodium aluminum tetraethyl. All of the above preparation reactions can be carried out at temperatures from about 0° C. to about 150° C.

Normally, solvents are not employed in the electrolysis system of this invention since they tend to reduce the conductivity of the electrolyte. However, when they are desired for certain purposes, such as to provide a more fluid medium, it is best to employ hydrocarbons, especially aromatic hydrocarbons which are unreactive with the reactants, products and electrolyte. Particularly suitable solvents are toluene, the xylenes and other substituted benzene and naphthalene compounds. In some cases the ethers can be used, especially the glycol ethers, such as ethylene glycol dialkyl ethers, diethylene glycol dialkyl ethers and triethylene glycol dialkyl ethers, wherein the alkyl group contains from 1–6 carbon atoms.

We claim:

1. A process for the manufacture of tetrahydrocarbon lead compounds wherein the hydrocarbon groups contain at least two carbon atoms, which comprises passing an electric current through an anhydrous electrolyte system and a lead anode, said electrolyte system consisting essentially of alkali metal tetrahydrocarbon aluminum, wherein from 5 to 95 percent of the hydrocarbon groups are methyl groups and the remaining hydrocarbon groups other than methyl groups attached to the aluminum are selected from the group consisting of aryl and alkyl groups having at least two carbon atoms.

2. The process of claim 1 further defined in that the electrolyte is formed by combining alkali metal aluminum tetramethyl and an alkali metal aluminum tetraalkyl, the alkyl groups thereof each having from 2 to 12 carbon atoms, the alkali metal aluminum tetramethyl being in a concentration of from 20 to 65 mole percent.

3. The process for the manufacture of tetraethyllead comprising forming an electrolyte by providing an alkali metal aluminum tetramethyl and alkali metal aluminum tetraethyl, the alkali metal aluminum tetramethyl being in proportions of from about 5 to 95 mole percent, and charging to an electrolytic zone, and electrolyzing by passing an electric current therethrough and through a lead anode in contact therewith and forming thereby tetraethyllead and removing the tetraethyllead from the electrolysis zone.

4. The process of claim 2 wherein the alkali metals of the electrolyte compounds are different.

5. A process for the manufacture of tetraethyllead which comprises passing an electric current through a lead anode and an electrolyte consisting essentially of approximately equimolar proportions of sodium tetramethylaluminum and sodium tetraethylaluminum at a temperature of about 100° C. and a current density of about 0.25 amperes per square centimeter.

References Cited in the file of this patent

UNITED STATES PATENTS

| | | |
|---|---|---|
| 2,849,349 | Ziegler et al. | Aug. 26, 1958 |
| 2,985,568 | Ziegler et al. | May 23, 1961 |

FOREIGN PATENTS

| | | |
|---|---|---|
| 214,834 | Australia | Apr. 24, 1958 |